Nov. 29, 1955  J. F. SWIFT ET AL  2,724,973
POWER TAKE-OFF
Filed July 31, 1951  3 Sheets-Sheet 1

Inventors:
John F. Swift
Carl A. Lindblom
By: Paul O. Pippel
Attorney.

Nov. 29, 1955 J. F. SWIFT ET AL 2,724,973
POWER TAKE-OFF

Filed July 31, 1951 3 Sheets-Sheet 2

Inventors:
John F. Swift
Carl A. Lindblom
By: Paul O. Rippel
Attorney.

Nov. 29, 1955     J. F. SWIFT ET AL     2,724,973
POWER TAKE-OFF

Filed July 31, 1951     3 Sheets-Sheet 3

Inventors:
John F. Swift
Carl A. Lindstrom
By: Paul O. Rippel
Attorney.

United States Patent Office 2,724,973
Patented Nov. 29, 1955

2,724,973
POWER TAKE-OFF

John F. Swift, Fort Wayne, and Carl A. Lindblom, Auburn, Ind., assignors to International Harvester Company, a corporation of New Jersey Application July 31, 1951, Serial No. 239,592

9 Claims. (Cl. 74—15.84)

This invention relates to power transmission systems in automotive vehicles and more particularly to a new and improved detachably mounted power take-off device positioned between a hydraulic torque converter and change speed gear means for driving various conventional power driven units.

Automotive vehicle manufacturers such as those producing trucks or the like have been presented of recent date with the problem of developing a power take-off attachment capable of being used in conjunction with a power transmission system including a hydraulic torque converter and change speed gearing. While there are many power take-off attachments on the market today the majority of them are complex and cumbersome or not particularly suitable for incorporation in a power transmission system utilizing hydraulic torque converters. Furthermore, since power take-off attachments do not, as a general rule, come as standard equipment with the vehicle when originally sold and must be purchased and installed in the field away from the factory, it is desirable from the manufacturing servicing, and customer standpoint to produce a power take-off attachment which is simple, cheap, and easy to install in a vehicle whether the vehicle is under construction or in one already in use without alteration of the hydraulic torque converter and change speed gearing. It is, therefore, the primary objective of the present invention to provide a power take-off attachment possessing all the desirable features noted above.

A further object is the provision of a compact power take-off attachment having an adapter plate which is readily substituted for the reactor plate of the hydraulic torque converter.

A still further object is the provision of a power take-off device which utilizes exactly the same attaching means employed to connect the reactor plate to the hydraulic torque converter casing and the change speed gear housing to thus obviate the prevalent necessity for boring new attaching holes.

Another object is to provide a power take-off attachment applicable to the power transmission system of a truck with minimum disturbance of the original installation and minimum requirement of time and labor.

The foregoing and other important objects and desirable features inherent in and encompassed by the invention, together with many of the purposes and uses thereof, will become readily apparent from a reading of the ensuing description in conjunction with the annexed drawings, in which, Figure 1 is a side elevational view of a hydraulic torque converter and change speed gear assembly before application of the invention thereto; a portion of the assembly is cut away to better illustrate the reactor plate;

Figure 1:
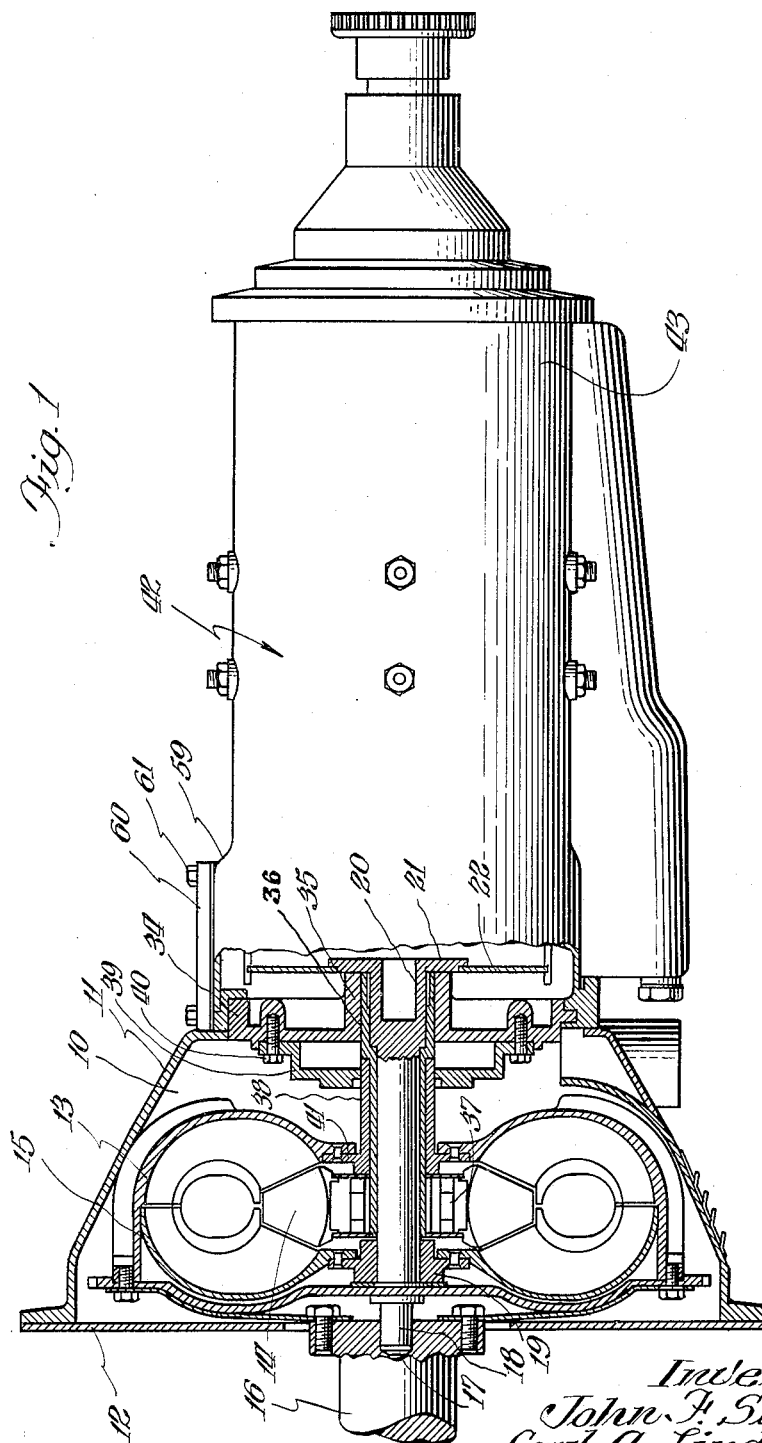

Referring to the drawings, in which like reference characters designate like elements throughout the various views, there is shown a conventional hydraulic torque converter designated generally by numeral 10. The torque converter 10 is mounted in a bell-shaped housing 11 which is rigidly connected to an engine crank case 12, partially shown in Figure 1, by any suitable means. The hydraulic torque converter 10 includes a vaned impeller 13 which encases a vaned rotor or reaction member 14, and a vaned stator 15. The drive or crank-shaft 16 of an internal combustion engine (not shown) extends through the crank case 12 and is connected to the impeller 13 to drive the same.

Referring to Figure 1 it will be noted that the drive shaft 16 is provided with an axially extending aperture 17 for rotatably receiving one end of a driven shaft 18. The stator or runner 15 is secured to a collar 19 which is splined to the driven shaft 18. The opposite end 20 of the driven shaft 18 has a radially extending flange 21 to which a rotatable plate 22 or the like is rigidly attached. The rotatable plate 22 is a clutch plate of the change speed gearing in the present disclosure but it is to be understood that any member of a change speed gear driven by the output shaft 18 of the torque converter could be used in lieu of the clutch member without departing from the spirit and scope of the invention.

Removably fastened to the bell-shaped housing 11 by means of four spaced bolts 33 is a reactor or end plate 34. It will be obvious from viewing Figure 3 that the bolts 33 are easily accessible from without the housing 11. The reactor plate 34 is provided with a hollow boss 35 for non-rotatably supporting one end of a hollow reactor shaft 36. The opposite end of the reactor shaft 36 supports the reactor member 14 which is held against rotation in one direction by a combined bearing and one-way brake 37 of conventional design. A sleeve 38 is rotatably supported by a pump casing 39 which is attached to the reactor plate 34 by means of bolts 40. The pump is not shown nor will it be described in detail since it forms no part of the present invention. The sleeve 38 is provided with a radially extending flange 41 to which the impeller 13 is attached.

The change speed gearing, designated generally by numeral 42, is enclosed by a substantially cylindrically-shaped housing 43. The housing 43 is in axial alignment with the torque converter housing 11 and is fastened to the reactor plate 34 by means of bolts 44 passing through countersunk apertures 64 in the plate and the housing 43. Counterbored apertures are provided to permit the converter housing 11 to lie flush against the reactor plate 34 without interference by the heads of bolts 44.

Figure 2:
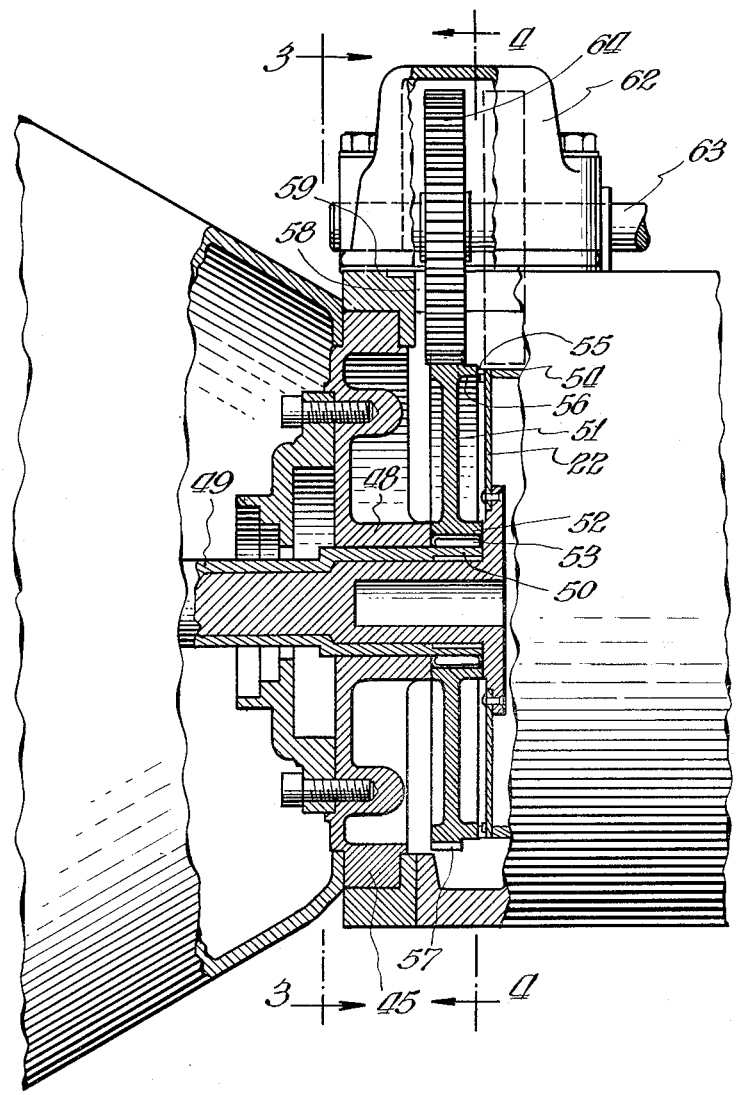
Figure 2 is an enlarged view of the connection between the torque converter casing and the change speed gear casing showing the power take-off attachment incorporated into the assembly.
Figure 3:
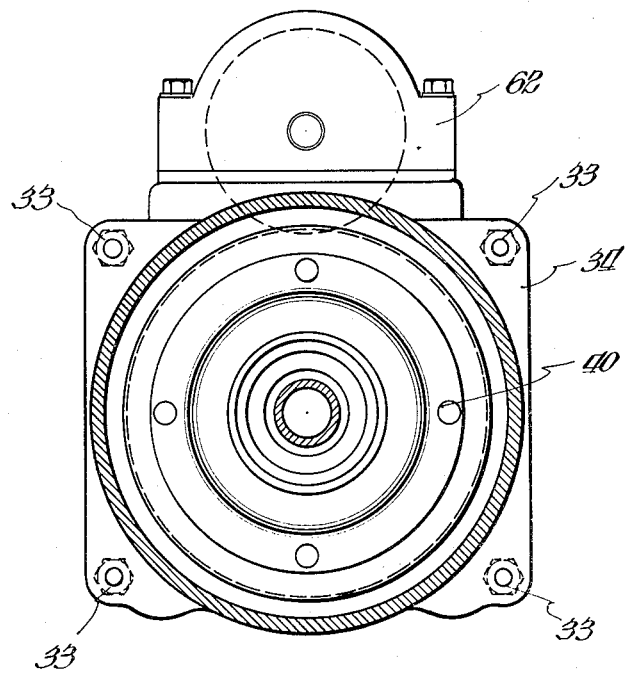
Figure 3 is a cross sectional view taken substantially along line 3—3 of Figure 2.
Figure 4:
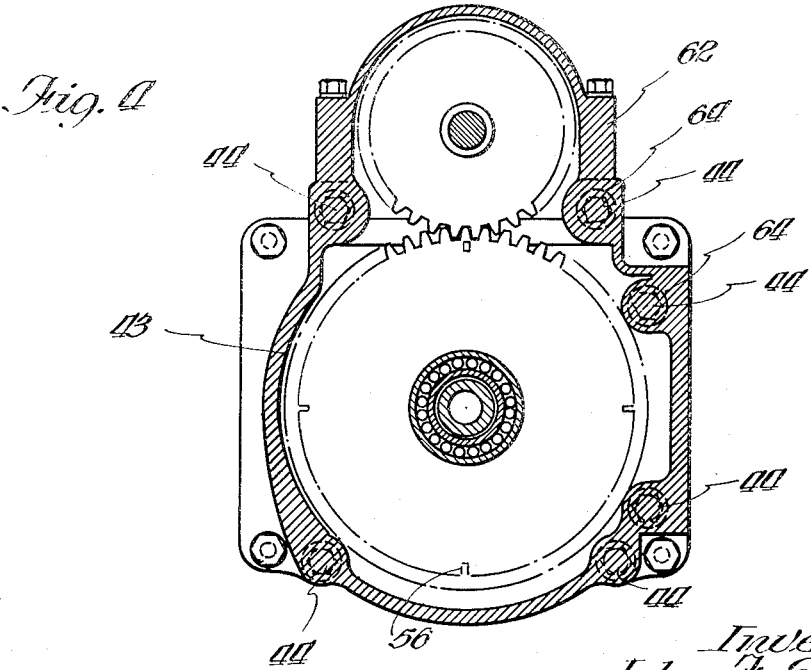
Figure 4 is a cross sectional view taken substantially along line 4—4 of Figure 2.

In order to obtain a power take-off drive from the above described torque converter and transmission without the necessity of providing new attaching holes and with minimum disturbance of the original installation an adapter plate 45, as shown in Figure 2, is substituted for the reactor plate 34. The adapter plate 45 has the same outer contour as the reactor plate 34 and is provided with four spaced threaded apertures for receiving four bolts in the same manner that is used to secure the converter housing 11 to the reactor plate 34. Likewise, the adapter plate 45 has countersunk apertures, registerable with threaded attaching holes receiving bolts 44. The hollow boss section 48 of the adapter plate 45 has a comparatively shorter axial length than the boss 35 of the reactor plate 34. Consequently, the reactor shaft 36 which is nonrotatably supported by the adapter plate 45 extends axially on both sides of the plate 45, rather than on one side only as when the reactor plate 34 supports the shaft 36. The portion 49 extending to the left of the adapter plate 45 as viewed in Figure 2 is provided with a combined bearing and one-way brake for supporting the reaction member 14. The section 50 projecting to the right, as shown in Figure 2, into the change speed gearing housing 43 serves as a bearing for rotatably supporting a power take-off gear 51. The hub 52 of the gear 51 has a self-retained needle bearing 53 pressed therein for engagement with the section 50. The cylindrical clutch drum 54 which is keyed to the outer periphery of the clutch plate 22 has a plurality of circumferentially spaced, axially extending open end slots 55 formed therein which are adapted to be engaged by axially projecting lugs 56 formed on the gear 51 adjacent the teeth 57 thereof. It will be apparent that the gear 51 is positively coupled to the clutch plate 22 and is driven thereby. An opening 58, defined by shoulders 59, is formed in the housing 43 and is normally covered with a flat pad 60 secured to the housing by bolts 61. However, when the power take-off drive gear 51 is mounted on section 50 the flat pad 60 is removed and replaced with a cup-shaped power take-off pad 62 as shown in Figures 2, 3, and 4. A power take-off shaft 63 is journaled in a pair of oppositely disposed side walls of the pad 62. A driven power take-off gear 64 is splined to the shaft 63 which is capable of sliding axially along the shaft from the full line position shown in Figure 2 wherein it is in meshing engagement with the gear 51 to the dotted line position wherein it is out of meshing engagement with the gear 51.

The embodiment of the invention chosen for the purposes of illustration and description herein is that preferred as the result of selective tests based upon the requirement for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A power take-off attachment for a power transmission system of the type having a pair of aligned casings detachably interconnected, one of said casings having rotatable torque transmitting elements therein and the other casing having a rotatable member therein driven by said transmitting elements comprising an adapter plate interposed between said casings for joining said casings together, said adapter plate non-rotatably supporting a shaft provided with a pair of bearing portions disposed on respective opposite sides of said plate, one of said bearing portions being adapted to support one of said torque transmitting elements and the other of said bearing portions rotatably supporting a power take-off gear, said gear being engageable with said rotatable member to be driven thereby when the power take-off attachment is incorporated in the power transmission system.

2. A power take-off attachment for a power transmission system of the type having a torque transmitter provided with a rotatable member and a casing, change speed gearing means having a rotatable element driven by said transmitter and a housing comprising, an adapter plate detachably interconnecting said casing and housing, said adapter plate rigidly and non-rotatably supporting a shaft provided with a pair of bearing portions disposed on respective opposite sides of said plate, one of said bearing portions being adapted to support said rotatable member and the other of said bearing portions rotatably supporting a power take-off gear, said gear being engageable with said rotatable element to be driven thereby when the power take-off attachment is incorporated in the power transmission system.

3. A power take-off attachment for a power transmission system of the type having a hydraulic torque transmitter provided with a reaction element and an open ended casing, change speed gearing means having a rotatable element driven by said transmitter and an open ended housing comprising, an adapter plate detachably interconnecting said casing and housing, said adapter plate rigidly supporting a shaft provided with a pair of bearing portions disposed on respective opposite sides of said plate, one of said bearing portions being adapted to support said reaction element and the other of said bearing portions rotatably supporting a power take-off gear, said gear being engageable with said rotatable element to be driven thereby when the power take-off attachment is incorporated in the power transmission system.

4. A power transmission system comprising a hydraulic torque transmitter having a rotatable input element, a rotatable output element, and an intermediate element capable of rotating in one direction; a casing for enclosing said transmitter provided with an open end; a plate for closing said open end; a hollow shaft supported by said plate having a first bearing portion for supporting said intermediate element and a second bearing portion; change speed gearing means including a rotatable member provided with a toothed surface; connecting means for drivingly connecting said output element and said rotatable member, said means including a shaft rotatably supported within said hollow shaft; and a power take-off gear rotatably supported on said second bearing portion having a toothed surface engageable with the toothed surface of said rotatable member.

5. A power transmission system comprising a hydraulic power transmitter of the kinetic type having a rotatable impeller element, a rotatable runner element, and a reactor element capable of rotating in one direction; a casing for enclosing said transmitter provided with an open end; a plate detachably secured to said casing for closing said open end; a hollow shaft projecting through and supported by said plate, said shaft having a first bearing portion on one side of said plate within said casing for supporting said reactor element and a second bearing portion disposed on the opposite side of said plate; change speed gearing means including a rotatable member provided with a coupling surface, said means being disposed in axial alignment with said hydraulic power transmitter, said means having a housing detachably secured to said plate; connecting means for drivingly connecting said runner element and said rotatable member, said means including a shaft rotatably supported within said hollow shaft; and a power take-off gear rotatably supported on said second bearing portion within said housing, said gear having a coupling surface engageable with the coupling surface of said rotatable member.

6. A power transmission system comprising a hydraulic torque transmitter having a rotatable input element, a rotatable output element, and an intermediate element capable of rotating in one direction; a casing for said transmitter provided with an open end; a plate secured to said casing for closing said open end; a hollow shaft projecting through and supported by said plate, said shaft having a first bearing portion on one side of said plate for supporting said intermediate element and a second bearing portion disposed on the opposite side of said plate; change speed gearing means including a rotatable member provided with a coupling surface, said means being disposed in axial alignment with said hydraulic torque transmitter; connecting means for drivingly connecting said output element and said rotatable member, said means including a shaft rotatably supported within said hollow shaft; and a power take-off gear rotatably supported on said second bearing portion, said gear having a coupling surface engageable with the coupling surface of said rotatable member.

7. A power transmission system comprising a hydraulic torque transmitter having a rotatable input element, a rotatable output element, and an intermediate element capable of rotating in one direction; a casing for enclosing said transmitter provided with an open end; a plate secured to said casing for closing said open end; a hollow shaft projecting through and supported by said plate, said shaft having a first bearing portion on one side of said plate for supporting said intermediate element and a second bearing portion disposed on the opposite side of said plate; change speed gearing means including a rotatable member provided with a toothed surface, said means being axially spaced from said hydraulic torque transmitter; connecting means for drivingly connecting said output element and said rotatable member, said means including a shaft rotatably supported within said hollow shaft; and a power take-off gear rotatably supported on said second bearing portion having a toothed surface engageable with the toothed surface of said rotatable member.

8. A power take-off attachment for a power transmission system of the type having a hydraulic torque transmitter provided with a rotatable member and a casing, change speed gearing means having a rotatable element and a housing, and means drivingly connecting said transmitter and said change speed gear means comprising, an adapter plate detachably interconnecting said casing and housing, said adapter plate rigidly supporting a hollow shaft provided with a pair of bearing portions disposed on respective opposite sides of said plate, said means driving connecting said transmitter and change speed gear means extending through and journaled in said hollow shaft, one of said bearing portions being adapted to support said rotatable member and the other of said bearing portions rotatably supporting a power take-off gear, said power take-off gear being engageable with said rotatable element to be driven thereby when the power take-off attachment is incorporated in the power transmission system.

9. A power take-off attachment for a power transmission system of the type having a pair of aligned casings detachably interconnected, one of said casings having torque transmitting elements therein and the other casing having a rotatable member therein driven by said torque transmitting elements comprising, an adapter plate interposed between said casings for joining said casings together, said adapter plate non-rotatably supporting a pair of bearing means disposed on respective opposite sides of said plate, one of said bearing means being adapted to support one of said elements and the other of said bearing means being adapted to rotatably support a power take-off gear, said gear being engageable with said rotatable member to be driven thereby when the power take-off attachment is incorporated in the power transmission system.

References Cited in the file of this patent

UNITED STATES PATENTS

| | | |
|---|---|---|
| 1,126,602 | Whitney | Jan. 26, 1915 |
| 2,027,592 | Hoffman | Jan. 16, 1936 |
| 2,033,597 | Tangen | Mar. 10, 1936 |
| 2,100,678 | Wagner | Nov. 30, 1937 |
| 2,152,607 | Schmitter | Mar. 28, 1939 |
| 2,168,033 | Johnston et al. | Aug. 1, 1939 |
| 2,302,509 | Tangen | Nov. 17, 1942 |
| 2,308,547 | Schneider | Jan. 19, 1943 |
| 2,349,880 | Orelind | May 30, 1949 |
| 2,480,938 | Lapsley | Sept. 6, 1949 |

FOREIGN PATENTS

| | | |
|---|---|---|
| 322,582 | Great Britain | Dec. 12, 1929 |